UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CONCRETE COATING AND THE LIKE.

1,400,041.     Specification of Letters Patent.     Patented Dec. 13, 1921.

No Drawing.     Application filed July 26, 1915. Serial No. 41,923.

*To all whom it may concern:*

Be it known that I, CARLETON ELLIS, a citizen of the United States, and a resident of Montclair, in the county of Essex and State of New Jersey, have invented certain new and useful Improvements in Concrete Coatings and the like, of which the following is a specification.

This invention relates to a composition of matter containing chlorinated material such as chlorinated naphthalene, naphthol and the like and relates especially to plastic, fluent or liquid compositions adapted for various purposes and illustratively as a coating composition for concrete and similar alkaline surfaces which because of their alkaline nature are likely to affect less resistant substances.

Chlorinated naphthalene and particularly the tetra and penta chlor naphthalene when admixed with resinous matters such as copal or rubber resins and the like form a useful composition which may be put to various industrial uses. For example this material may be dissolved in a thinning agent such as benzol to produce a composition of about the consistency of thin varnish which may be used as a coating composition as aforesaid. Or the resinous material may be omitted and chlorinated naphthalene used alone with the solvent. Chlorinated naphthalene or naphthol in admixture with other chlorinated compounds may be used if desired.

Chlorinated linseed, tung, cottonseed, corn and rosin oils and the like also in some form may be used as thickening or solidifying material. In a similar manner polymerized oils may be incorporated if desired in conjunction with resinous bodies. The non-drying oils and the semi-drying oils may either be chlorinated or treated with sulfur or without such treatment may likewise be incorporated with the chlorinated naphthalene material or other equivalent agent.

Various solvents may be used for producing a liquid mixture when same is desired, including benzol and its homologues such as toluol and xylol; also carbon bisulfid, carbon tetrachlorid and other chlorids of carbon such as the chlorids of ethylene and ethane which afford non-inflammable or flameproof solutions. Petroleum, benzin, kerosene, light kerosene or heavy benzin, anilin, light oils of wood tar, wood and grain alcohols, acetone oil, kerosene and other ketones, ethers and esters also may be employed as also spirits of tar, wood tar, rosin tar, pine oil and fir tree oil. In the case of acetone solutions and the like nitrocellulose or celluloid or other colloidal substances soluble in alcoholic or other menstruums may be used as thickeners. The barium and calcium soaps of castor oil are somewhat soluble in alcoholic bodies and may likewise be employed if desired.

Various waxy materials may be incorporated including Chinese and Japanese wax, carnauba, candellila and shellac wax, or preferably spermacetti, paraffin, ceresin, montan and similar mineral waxy materials may be employed especially when the composition is to be used as a coating material for such alkaline surfaces as concrete.

Besides the resins mentioned; manila, congo, colophony and rosin esters as well as the esters of phenol, cresol, naphthol with glycerin and their condensation products may be employed. The condensation products of phenol, cresol, or other phenolic bodies with formaldehyde are advantageous particularly if the condensation is not carried beyond a certain point so as not to preclude their use in soluton with the materials as aforesaid. Tetra or penta chlornaphthalene may be incorporated with such artificial resins or plastics in any desired proportion.

A form of acid material soluble in organic compounds may be obtained from naphthalene by chlorinating to form the hydrochlorid of naphthalene chlorid. This affords hydrochlorids having the advantage of substantial freedom from corrosive action and so may replace hydrochloric acid to advantage, in case it is desired to neutralize cement alkali in this way.

For coating acid tanks or as a dip for concrete vessels or coating therefor, especially concrete vats which are to be exposed to acids or acid fumes, a solution of equal parts of Pontianak rubber resin and tetra chlorinated naphthalene dissolved in benzol may be used. In a similar manner the penta chlorinated naphthalene may be employed.

These highly chlorinated naphthalene bodies are more or less soluble in the solvents mentioned and in some cases have a tendency to crystallize from solution forming long fibrous needles which form oftentimes is advantageous in creating a web-like structure, the fibers of which are bound together by resinous material present.

Chlorinated naphthalene may be admixed with asphaltic or other similar substance such as the various petroleum and mineral oils and residuums. These may be used for coating purposes as aforesaid.

A substantially flame-proof coating is obtained by the composition herein illustratively set forth and the applications of the invention are diverse because of this useful quality.

The present application is partially a continuation of my copending applications Serial Numbers 640,401 filed July 25, 1911, and 655,214, filed October 17, 1911, now Patents 1,189,550 and 1,189,551, respectively, dated July 4, 1916.

In application 640,401, I have disclosed compositions comprising solutions of Pontianak or Jelutong rubber resin, which solutions have added to them a thickener (among which chlorinated naphthalene and chlorinated naphthol are mentioned also the hydrochlorid of chlor-naphthalene). The solvents may be benzene, benzin, $CCl$, $CS_2$ and others.

In application 655214, I have disclosed mixtures for coating concrete comprising for example Pontianak resin, chlorinated naphthalene, or chlorinated naphthol and thinners. The use of chlorinated oils is also referred to therein. Solvents such as above stated may be used therewith.

What I claim is:

1. A composition of matter comprising tetra chlorinated naphthalene and other solid material capable of being blended therewith and acting as a solid solvent therefor.

2. A composition of matter comprising highly chlorinated naphthalene and other solid material incorporated therewith, capable of acting as a solvent therefor, together with a liquid which acts as a common solvent for such two materials.

3. A composition of matter comprising chlorinated naphthalene derivative containing not less than four chlorin atoms per molecule and a neutral solid body comprising a rubber resin.

4. A composition of matter comprising highly chlorinated naphthalene and a neutral solid body of a substantially resinous character comprising Pontianak rubber resin.

5. A composition of matter comprising substantially equal parts of a highly chlorinated naphthalene and a resin.

6. A composition of matter comprising a chlorinated naphthalene containing not less than four nor more than five atoms of chlorin per molecule, together with resin.

7. A composition of matter comprising a highly chlorinated naphthalene derivative and a non-acid vegetable organic material blended therewith, such vegetable material consisting largely of unsaponifiable constituents, such two materials being soluble in a common solvent.

8. A composition adapted for use as a cement coating compound, comprising highly chlorinated naphthalene Pontianak resin and a thinner.

9. A composition of matter comprising tetrachlor naphthalene and a resinous body.

10. A composition of matter comprising a highly chlorinated naphthalene derivative, a resin and a chemically modified fatty oil, such three materials being soluble in a common solvent.

11. A composition of matter comprising chlorinated naphthalene, a non-acid resinous body and a thinner.

12. A composition of matter adapted for use as a coating composition comprising a highly chlorinated naphthalene material comprising tetra chlor naphthalene, a non-acid vegetable resin and a thinning agent.

13. A composition of matter comprising a highly chlorinated naphthalene derivative and a resin derived from a plant.

14. A composition of matter in the form of a solution comprising highly chlorinated naphthalene, a resin consisting largely of unsaponifiable substances and hydrocarbon material incorporated therewith.

15. The process of coating cement-containing surfaces which comprises applying thereto a composition containing chlor-naphthalene and a resin consisting largely of unsaponifiable material.

16. The process of coating cement-containing surfaces to render them resistant which comprises applying a superficial layer of an unsaponifiable solid of the aromatic series to said surfaces.

17. A composition of matter comprising a chlorinated, water-insoluble, waxy body and a neutral resinous body.

18. A composition of matter comprising a highly chlorinated naphthalene derivative and a non-acid vegetable organic material blended therewith, such vegetable material consisting largely of unsaponifiable constituents, and a liquid forming a common solvent, of the two first-mentioned substances.

19. A composition of matter comprising a highly chlorinated naphthalene derivative, a resin and a polymerized fatty oil.

20. A process of coating cement containing surfaces to render them resistant, which comprises applying a superficial layer thereto, containing a highly chlorinated naphthalene derivative and Pontianak resin.

21. A composition comprising a chlorinated compound having the naphthalene ring structure, and a vegetable resin which consists largely of non-acid unsaponifiable substances.

CARLETON ELLIS.